(12) United States Patent
Bass et al.

(10) Patent No.: US 11,535,464 B2
(45) Date of Patent: Dec. 27, 2022

(54) ATV HITCH AND LIFT ATTACHMENT

(71) Applicants: Austin Taylor Bass, San Leon, TX (US); Clinton Ray Gaskins, San Leon, TX (US)

(72) Inventors: Austin Taylor Bass, San Leon, TX (US); Clinton Ray Gaskins, San Leon, TX (US)

(73) Assignee: SCORPION OFF ROAD PRODUCTS, LLC, Austin, TX (US)

( * ) Notice: Subject to any disclaimer, the term of this patent is extended or adjusted under 35 U.S.C. 154(b) by 0 days.

(21) Appl. No.: 17/332,924

(22) Filed: May 27, 2021

(65) Prior Publication Data

US 2021/0387820 A1  Dec. 16, 2021

Related U.S. Application Data

(60) Provisional application No. 63/036,965, filed on Jun. 9, 2020.

(51) Int. Cl.
 *B65G 67/04* (2006.01)
(52) U.S. Cl.
 CPC .................................. *B65G 67/04* (2013.01)
(58) Field of Classification Search
 CPC ....... B60P 1/5471; B60P 1/5476; B60P 1/548; B65G 67/04; B66C 23/44; B66C 23/48; B66C 23/166; B66C 23/36; B66C 23/42
 USPC .................. 212/179, 180, 294, 299; 414/462
 See application file for complete search history.

(56) References Cited

U.S. PATENT DOCUMENTS

| | | | | |
|---|---|---|---|---|
| 4,099,628 A * | 7/1978 | Richardson | ............. | B66C 23/42 212/281 |
| 6,089,431 A * | 7/2000 | Heyworth | .............. | B60D 1/075 224/521 |
| 7,604,450 B1 * | 10/2009 | Calvery | .................. | B66C 23/44 212/270 |
| 7,931,524 B2 * | 4/2011 | McKenzie | ............. | A22B 7/006 452/187 |
| 9,282,752 B1 * | 3/2016 | Wylie | .................... | A22B 5/161 |
| 9,327,947 B2 * | 5/2016 | Davis | ...................... | B66C 23/44 |
| 10,023,129 B2 * | 7/2018 | Ehlers | ...................... | B66C 23/44 |
| 2015/0023009 A1 * | 1/2015 | White | ................. | G09F 15/0062 40/607.1 |

* cited by examiner

*Primary Examiner* — Gregory W Adams
(74) *Attorney, Agent, or Firm* — José W. Jimenez; Jimenez Law Firm

(57) ABSTRACT

A load lifting and carrying apparatus that has a base with a distal end designed to horizontally couple to a vehicle frame. A dividable vertical frame has a top and a bottom end, the bottom end coupled to a proximal end of the base and supported by a horizontal bracket support. The upper portion of the vertical frame is narrower than and designed to slide at least partly into the lower portion, at least one pair of holes aligned on the upper and lower portion and coupled by at least one bolt assembly. A vertically foldable cantilevering coplanar arm is coupled to a proximal and distal rotatable pully assembly, the middle portion of the coplanar arm assembly removably coupled to a support arm. A winch assembly mounted to the lower portion of the vertical frame is designed to pull a cable over the pulleys to provide a lifting force for towing.

19 Claims, 16 Drawing Sheets

ATV HITCH AND LIFT ATTACHMENT

CLAIM OF PRIORITY

This application claims priority to and the benefit of U.S. Provisional application with Ser. No. 63/036,965, filed on Jun. 9, 2020, which is incorporated herein by reference in its entirety.

FIELD OF THE INVENTION

The inventive concept relates generally to an ATV hitch and lift attachment.

BACKGROUND

Currently, there are a number of solutions for towing an all-terrain vehicle (ATV). One of these solutions attempts to employ a tow rope, but this solution fails to meet the needs of the market because tow ropes can break and provide primarily a horizontal, towing force. Another solution attempts to utilize a trailer, but this solution is similarly unable to meet the needs of the market because trailers cannot retrieve an ATV that is stuck, especially where maneuver room is limited. Still another solution seeks to utilize a truck, but this solution also fails to meet market needs because trucks may be too large to reach an ATV. The primary way to recover a broken ATV on a trail is to use straps and tug the ATV behind a working ATV. If the front end of the towed ATV is broken, doing so could result in damage such as bending the frame or breaking more of the front end. Therefore, there currently exists a need in the market for a load lifting and carrying apparatus that attaches to the back of, or onto, an ATV to tow other ATVs.

SUMMARY OF THE INVENTION

The inventive concept is a load lifting and carrying apparatus designed for attachment to a vehicle. That vehicle may be an ATV or all-terrain vehicle but may also be other vehicle types. A base assembly has a distal end and a proximal end, the distal end designed to horizontally couple to a vehicle frame assembly. The coupling to a vehicle frame assembly in one embodiment includes a hitch assembly. A vertical frame assembly has a top end and a bottom end, the bottom end of the vertical frame assembly coupled to the proximal end of the base assembly and supported by a proximal horizontal bracket support member, the vertical frame assembly horizontally divided to create an upper portion and a lower portion of the vertical frame assembly. The upper portion of the vertical frame assembly is narrower than the lower portion and designed to at least partially slide into the lower portion of the vertical frame assembly. At least one hole member pair is aligned horizontally on the upper portion and the lower portion of the vertical frame assembly and is coupled by at least one removable bolt assembly. One of ordinary skill in the art would recognize that the lower portion of the vertical frame assembly could be narrower than the upper portion and designed to slide inside the upper portion.

A vertically foldable and cantilevering coplanar arm assembly has a proximal end, a distal end, and a middle portion, a right side portion of the coplanar arm assembly and a left side portion of the coplanar arm assembly coupled to a proximal rotatable pully assembly and a distal rotatable pully assembly, the distal end of the coplanar arm assembly rotatably coupled to the top end of the vertical frame assembly and designed to at least partially rotate substantially vertically, the middle portion of the coplanar arm assembly removably coupled to a support arm assembly at a proximal end of the support arm assembly, a distal end of the support arm assembly pivotally coupled to the upper portion of the vertical frame assembly and designed, when coupled to the coplanar arm assembly, to create a substantially rigid triangular bracket structure. A winch assembly is mounted to the lower portion of the vertical frame assembly designed to pull a cable assembly between the right and left side portions of the coplanar arm assembly and over the distal and proximal pully assemblies coupled to the coplanar arm assembly to provide a lifting force to an object attached to the cable assembly thereto. One of ordinary skill in the art would recognize that the winch assembly could be manually powered or powered by an electric or other motor. In one embodiment of the load lifting and carrying apparatus designed for attachment to a vehicle, the winch assembly is manually powered.

In one embodiment of the load lifting and carrying apparatus designed for attachment to a vehicle, at least five hole member pairs are horizontally disposed on the upper portion of the vertical frame assembly and coupled by at least one removable bolt assembly to the lower portion of the vertical frame assembly designed to set the vertical frame assembly at variable heights.

In one embodiment of the load lifting and carrying apparatus adapted for attachment to a vehicle, a plurality of notch assemblies may be disposed on a bottom portion of the coplanar arm assembly designed to couple with and secure the distal end of the support arm assembly. The plurality of notch assemblies allows the coplanar arm assembly to be positioned at angles other than substantially horizontal, for example, to be angled substantially higher or less than ninety degrees in order to lift a load higher. In one embodiment of the inventive concept, three notch assemblies are disposed on the bottom portion of the coplanar arm assembly.

The inventive concept allows any vehicle with a receiver hitch to recover ATVs. When an ATV breaks from the front it cannot be towed using traditional tow straps. The ATV needs to be lifted to prevent damage on the way to a destination. The inventive concept as a recovery hitch would allow the front end of the ATV to be lifted and towed safely. The inventive concept as a hitch is meant for trail riding where bigger trucks and cars are denied, but the inventive concept could be coupled to a truck or car. A male hitch receiver may slide into any female hitch receiver. Holes are drilled for various lengths from the receiver to also include the vertical frame assembly and the coplanar arm assembly which may be called the neck and crane area. The inventive concept can be used to tow or be raised high enough to skin animals during hunting season and can be put in stow mode for driving to create a smaller profile. The inventive concept is meant to be extended to the right height and attached to a broken ATV. The inventive concept would be able to raise the front end of the ATV to prevent damage while towing.

It would be advantageous to have a load lifting and carrying apparatus that is adjustable. Still further, it would be advantageous to have a load lifting and carrying apparatus that is adaptable.

The inventive concept advantageously fills the aforementioned deficiencies by providing an ATV hitch attachment, which provides a way to easily transport items behind an ATV.

The inventive concept is substantially an ATV towing crane.

The load lifting and carrying apparatus may have a hitch attachment.

The load lifting and carrying apparatus may have a rotating arm.

The load lifting and carrying apparatus fulfills the need for an ATV mountable towing system.

Among other things, it is an advantage of the inventive concept to provide an ATV hitch attachment that does not suffer from problems or deficiencies associated with prior solutions.

Still further, the load lifting and carrying apparatus may have a winch mounting plate. In a related embodiment, the vertical frame assembly includes light assembly includes a solar cell and a battery for providing portable energy.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
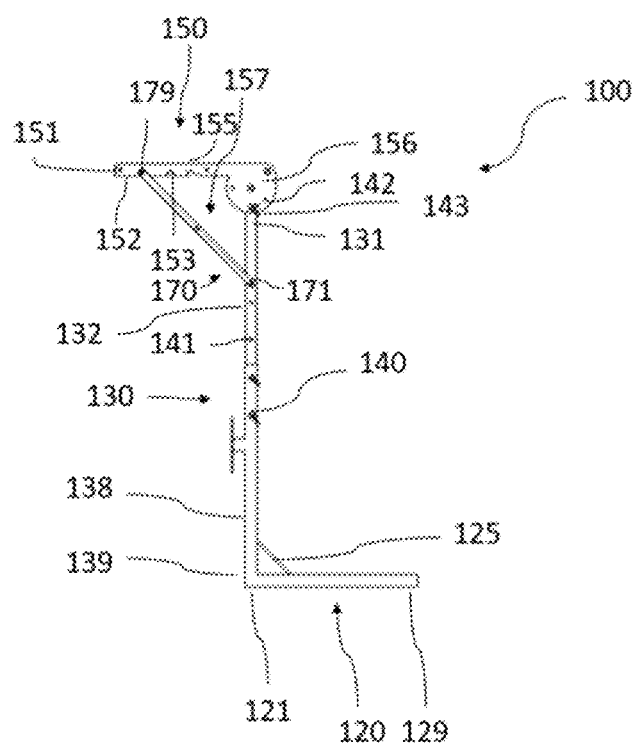
FIG. 1 illustrates a right side view of a load lifting and carrying apparatus without a winch assembly according to the teachings herein.
Figure 2:
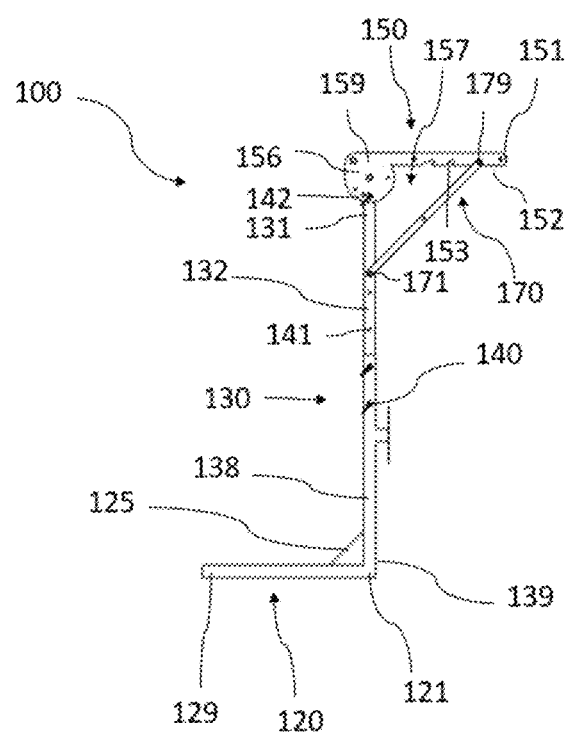
FIG. 2 illustrates the left side view of the lifting and carrying apparatus without the winch assembly.
Figure 3:
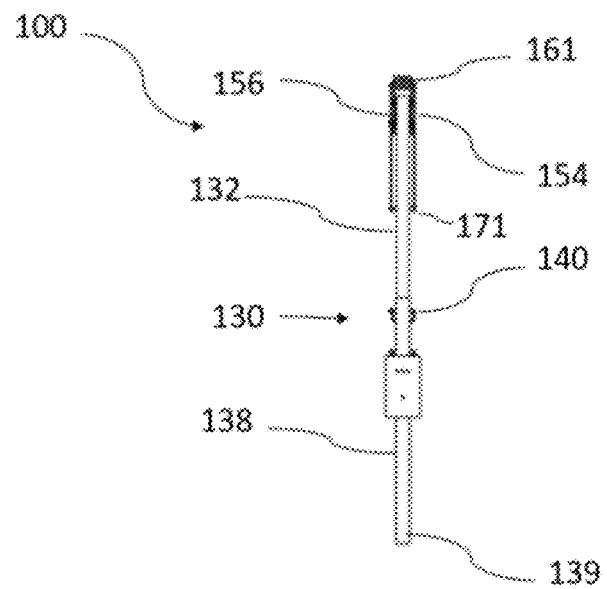
FIG. 3 illustrates the front of the lifting and carrying apparatus.
Figure 4:
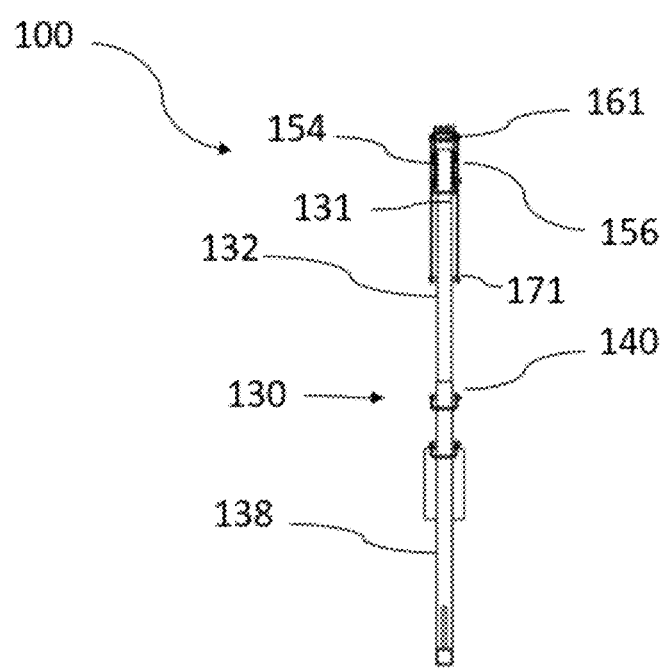
FIG. 4 illustrates the back of the lifting and carrying apparatus.
Figure 5:
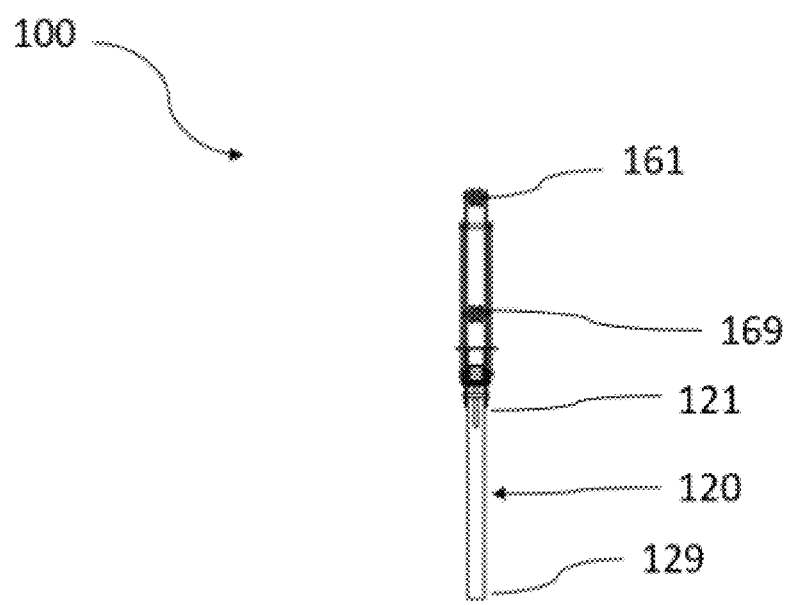
FIG. 5 illustrates the top of the lifting and carrying apparatus.
Figure 6:
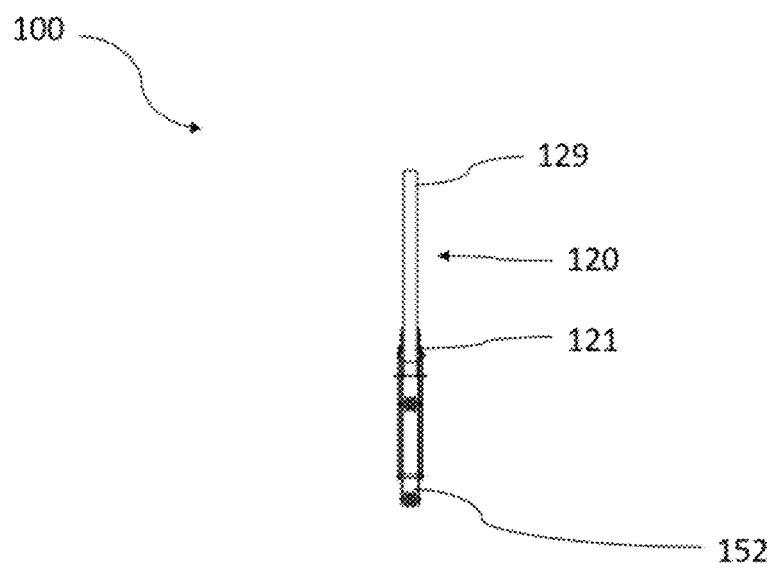
FIG. 6 illustrates the bottom of the lifting and carrying apparatus.
Figure 7:
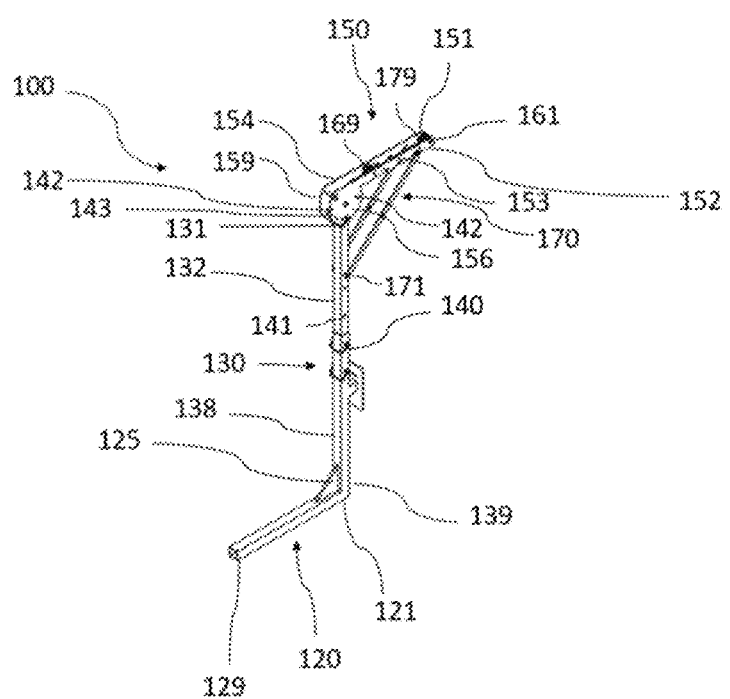
FIG. 7 illustrates the perspective view of the lifting an carrying assembly.
Figure 8:
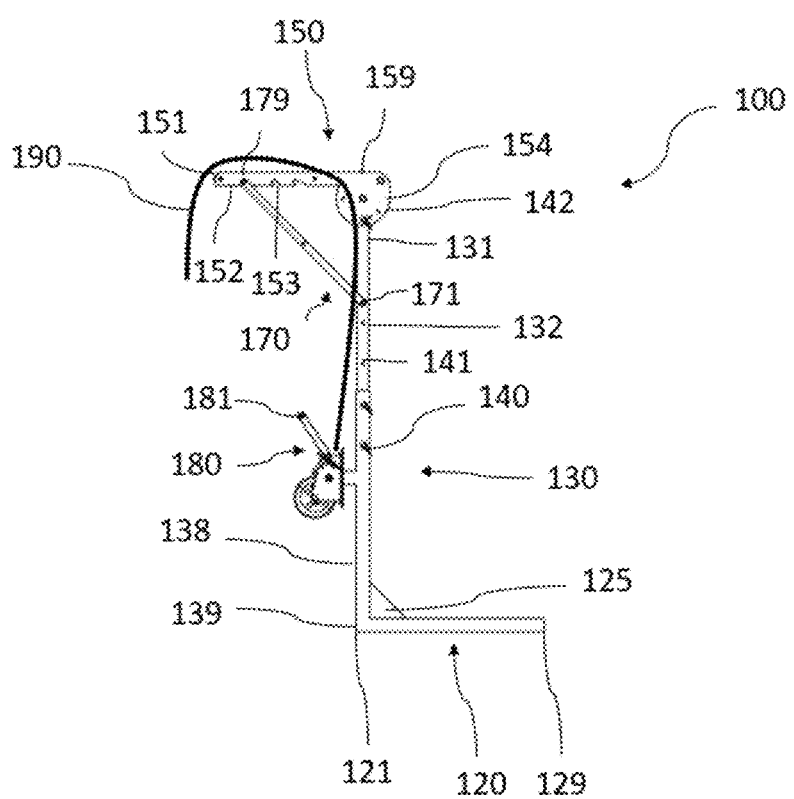
FIG. 8 illustrates the right side view of the load lifting and carrying assembly with a winch assembly.
Figure 9:
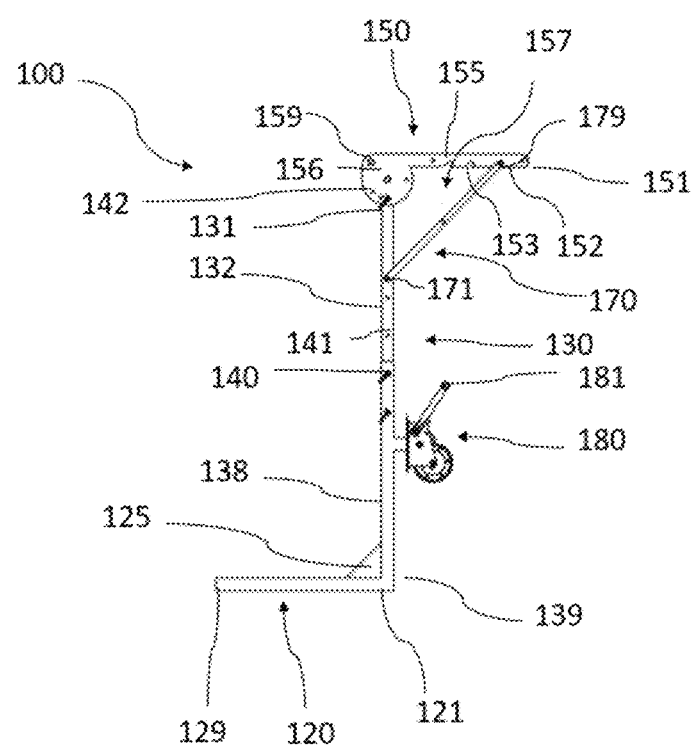
FIG. 9 illustrates the left side view of the load lifting and carrying assembly with the winch assembly.
Figure 10:
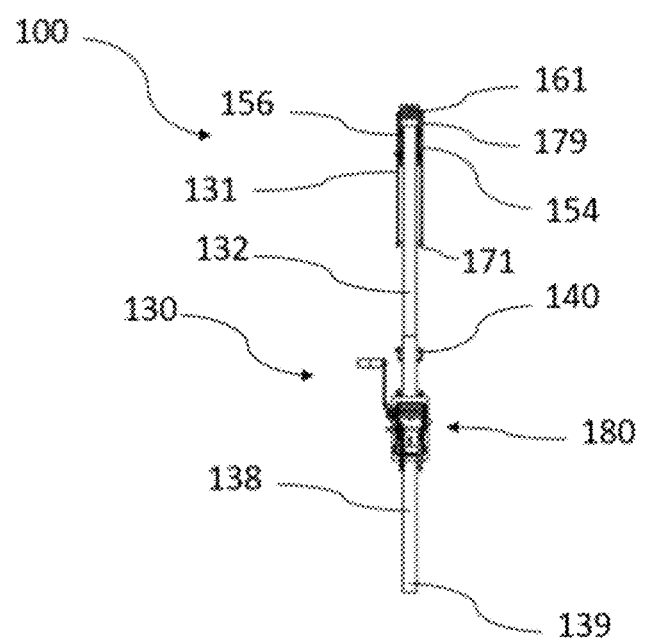
FIG. 10 illustrates the front view of the load lifting and carrying assembly with the winch assembly and a cantilevering coplanar arm assembly.
Figure 11:
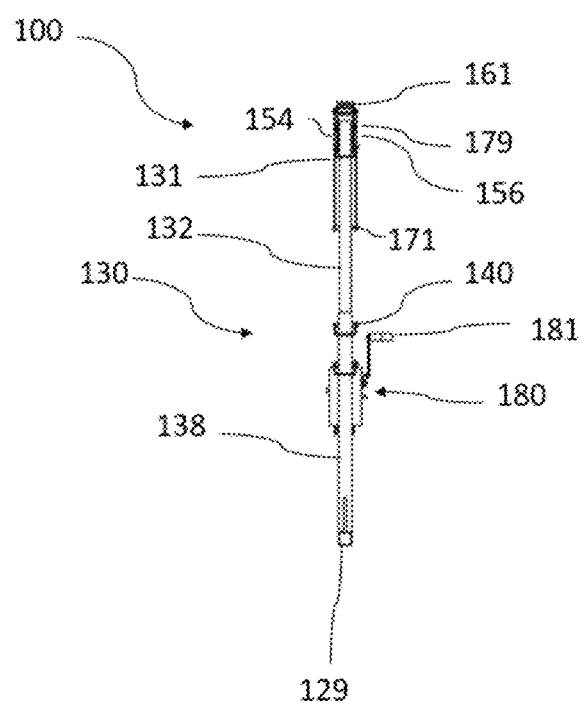
FIG. 11 illustrates the back view of the load lifting and carrying assembly with the winch assembly and the cantilevering coplanar arm assembly.
Figure 12:
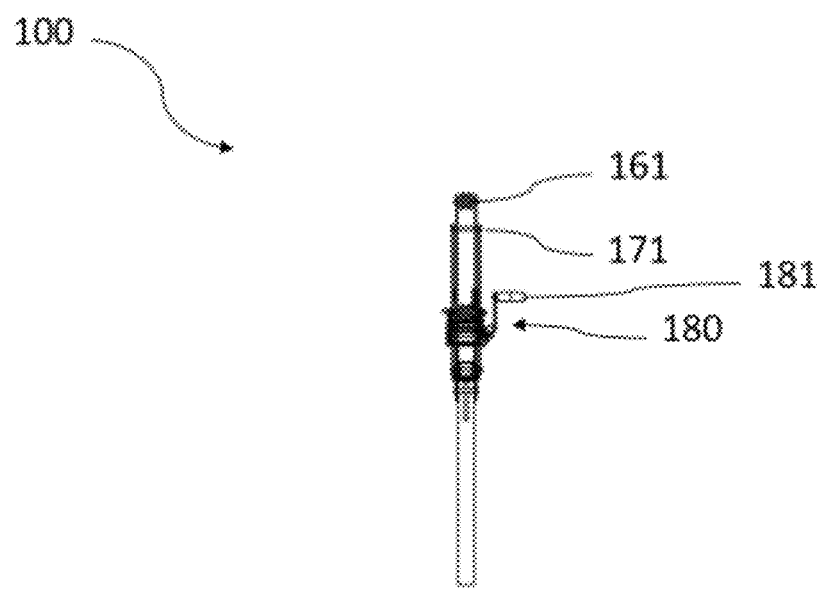
FIG. 12 illustrates the top view of the load lifting and carrying assembly with the winch assembly and the cantilevering coplanar arm assembly.
Figure 13:
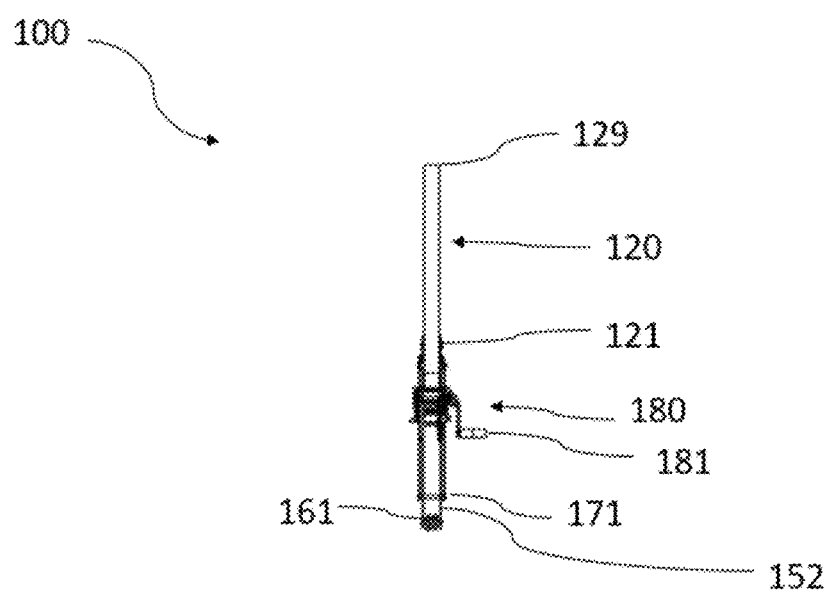
FIG. 13 illustrates the bottom view of the load lifting and carrying assembly with the winch assembly and the cantilevering coplanar arm assembly.

Referring now to the Figures, FIGS. 1-14 illustrate the inventive concept as a load lifting and carrying apparatus 100 designed for attachment to a vehicle, but is not necessarily limited to a terrain vehicle. Lifting and carry assembly 100 includes a base assembly 120 coupled to a vertical frame assembly 130 which in turn is coupled to a cantilevering coplanar arm assembly 150. Apparatus 100 further includes a winch assembly 180 may be mounted to the lower portion 138 of the vertical frame assembly 130 designed, as illustrated in FIG. 8, to pull a cable assembly 190.

In this embodiment, base assembly 120 has a distal end 129 of the base assembly 120 and a proximal end 121 of the base assembly 120, the distal end 129 designed to horizontally couple to a vehicle frame assembly 130. The vertical frame assembly 130 has a top end 131 and a bottom end 139, the bottom end 139 coupled to the proximal end 121 of the base assembly 120 and supported by a proximal horizontal bracket support member 125, the vertical frame assembly 130 horizontally divided to form an upper portion 132 and a lower portion 138 of the vertical frame assembly 130. The upper portion 132 of the vertical frame assembly 130 is narrower than the lower portion 138 and designed to at least partially telescopically slide into and within the lower portion 138 of the vertical frame assembly 130, facilitating vertical movement and extension of upper portion 132. At least one hole member pair 140 is aligned horizontally on the upper portion 132 and the lower portion 138 of the vertical frame assembly 130 and is coupled by at least one removable bolt assembly 141 to secure both portions in place.

FIGS. 1-14 further illustrate that in this example embodiment, five hole member pairs 140A-140E (not all shown) disposed through the upper portion 132 of the vertical frame assembly 130 are designed to be aligned horizontally with two hole member pairs 140F and 140G disposed through the lower portion 138 of the vertical frame assembly 130 and coupled by two removable bolt members 141, one in each of the aligned hole member pairs 140F and 140G.

FIGS. 8-14 further illustrate that in this example embodiment, vertically foldable and cantilevering coplanar arm assembly 150, with a supporting arm assembly 170, that has a proximal end 151, a distal end 159, and a middle portion 155, a right side portion or member 154 of the coplanar arm assembly 150 and a left side portion or member 156 of the coplanar arm assembly 150 (both members forming a rotating bi-plate for arm assembly 150). Coplanar arm assembly 150 is coupled to and includes therebetween right side and left side members 155 and 156, respectively, a proximal rotatable pully assembly 161 and a distal rotatable pully assembly 169 (see FIGS. 10-13). Distal end 159 of the coplanar arm assembly 150 is rotatably coupled to the top end 131 of the vertical frame assembly 130 and designed to at least partially rotate substantially vertically, the middle portion 155 of the coplanar arm assembly 150 removably coupled to a support arm assembly 170 at a proximal end 171 of the support arm assembly 170. A distal end 179 of the support arm assembly 170 is pivotally coupled to the upper portion 132 of the vertical frame assembly 130 and designed, when coupled to the coplanar arm assembly 150, to create a substantially rigid triangular bracket structure 157.

FIGS. 8-14 further illustrate that in this example embodiment, the bottom portion of the cantilevering coplanar arm assembly 150 has three notch portions 153A-153C disposed thereon. The vertically foldable and cantilevering coplanar arm assembly 150 designed to be set at at least one or more of a right angle and an obtuse angle relative to the vertical frame assembly 130 with the use of notch portions 153A-153C and arm assembly 170.

FIGS. 8-14 further illustrate that a winch assembly 180 may be mounted to the lower portion 138 of the vertical frame assembly 130 designed, as illustrated in FIG. 8, to pull a cable assembly 190 between the right side portion 154 and left side portion 156 of the coplanar arm assembly 150 and over the distal pully assembly 169 and proximal pulley assembly 161 coupled to the coplanar arm assembly 150 to provide a lifting force to an object attached to the cable assembly 190 thereto.

Figure 14:
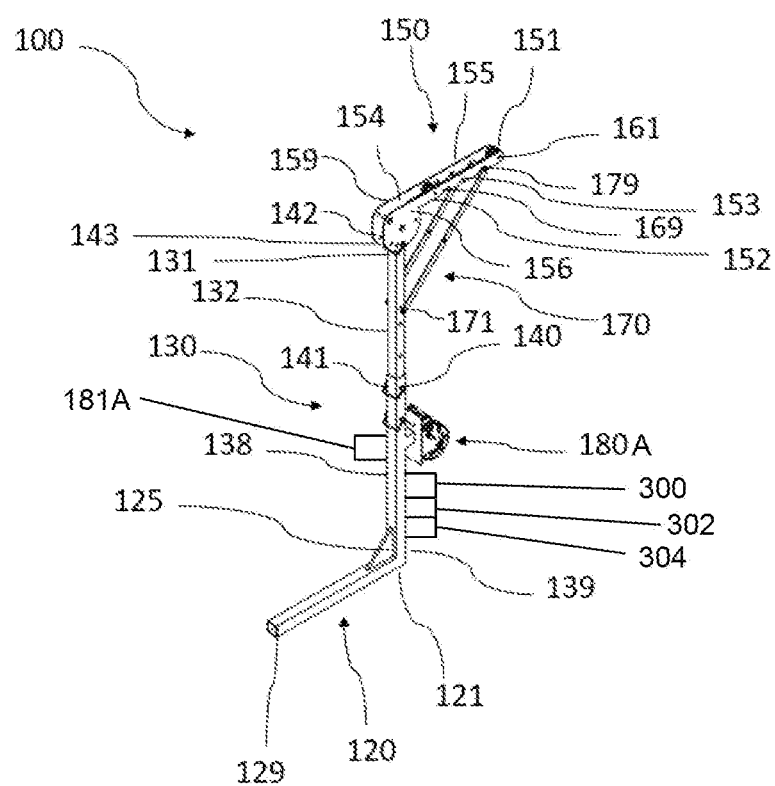
FIG. 14 illustrates the perspective view of the load lifting and carrying assembly with the electric winch assembly and the cantilevering coplanar arm assembly with a supporting arm assembly.

FIG. 14, in particular, further illustrates that in this example embodiment, a right side portion and a left side portion of the cantilevering arm assembly 150, at the distal end, has four each horizontally corresponding hole members 142A-142D designed to align with a hole member 143 horizontally disposed through an upper portion 132 of the upper vertical frame assembly 130, a bolt member 141 designed to be disposed through corresponding hole members 142A-142D of the right side portion and the left side portion of the cantilevering arm assembly 150, the bolt member designed to secure the foldable and cantilevering coplanar arm assembly 150 at a selected angle. The electric winch assembly 180A in this embodiment is driven by an electric motor 181A. In this example embodiment, assembly 100 includes a light 300, a solar cell 302, and a battery 304 that can be charged by the solar cell.

FIG. 14 further illustrates that in this example embodiment of the load lifting and carrying apparatus designed for attachment to a vehicle 100, three notch assemblies 153A-153C are disposed on a bottom portion 152 of the coplanar arm assembly 150 designed to couple with and secure the distal end 179 of the support arm assembly 170 to provide the various angles of support.

FIGS. 8-14 further illustrate that in this example embodiment of the load lifting and carrying apparatus adapted for attachment to a vehicle 100, the winch assembly 180 is manually powered by way of a handle member 181.

FIG. 1-14 further illustrates that in this example embodiment of the load lifting and carrying apparatus 100 is designed for attachment to a vehicle 100, one or more hole members 140 are disposed through the base assembly 120 is designed to be secured with one or more corresponding bolt members 141 through corresponding hole members 140 disposed through a vehicle hitch member. The various figures further illustrates that in this example embodiment of the load lifting and carrying apparatus adapted for attachment to a vehicle 100, the vertical frame assembly 130 can be set substantially at 58, 64, 68, 74, and 88 inches in height.

FIG. 1-14 further illustrates that in this example embodiment of the load lifting and carrying apparatus 100 is designed for attachment to a vehicle 100, the cantilevering coplanar arm assembly 150 being substantially 26 inches long. The cantilevering coplanar arm assembly 150 can be set substantially at various rotational angles including 0 degrees, 90 degrees, 110 degrees, and 130 degrees. The base assembly 120 in this embodiment is substantially 28 inches long and 2 inches wide.

FIG. 1-14 further illustrates that in this example embodiment of the load lifting and carrying apparatus 100 is designed for attachment to a vehicle 100, a hole member 140 horizontally is disposed through the support arm assembly 170 and is designed to align with a hole member 140 horizontally disposed through the upper portion 132 of the upper vertical frame assembly 130 when the cantilevering arm assembly 150 is in a folded state.

Figure 15A:
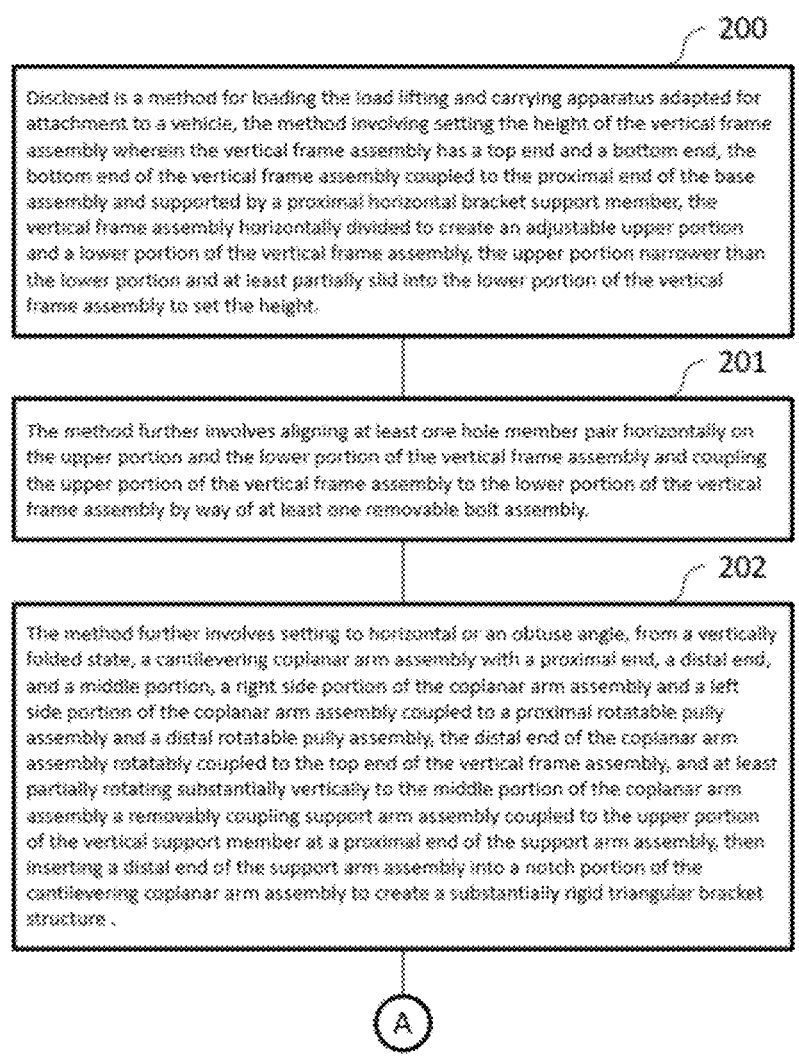
FIGS. 15A and 15B illustrate a flowchart for a method of securing a load lifting and carrying apparatus to a vehicle, such as an ATV or any other vehicle.
Figure 15B:
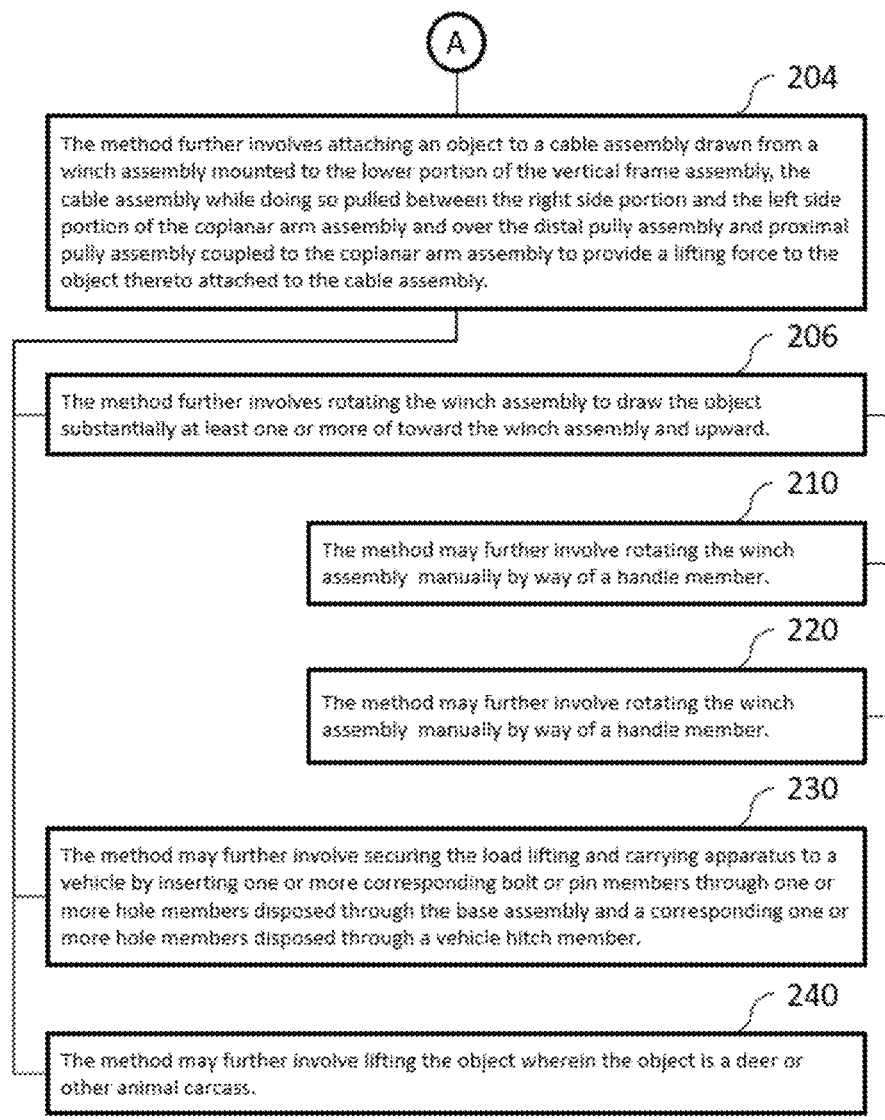

Disclosed in FIGS. 15A and 15B is a method for loading the load lifting and carrying apparatus adapted for attachment to a vehicle 100, the method including step 200 of setting the height of the vertical frame assembly 130 wherein the vertical frame assembly 130 has a top end 131 and a bottom end 139, the bottom end of the vertical frame assembly 139 coupled to the proximal end of the base assembly 121 and supported by a proximal horizontal bracket support member 125, the vertical frame assembly 130 horizontally divided to create an adjustable upper portion 132 and a lower portion 138 of the vertical frame assembly 130, the upper portion 132 narrower than the lower portion 138 and at least partially slid into the lower portion 138 of the vertical frame assembly 130 to set the height. The method further involves 201 aligning at least one hole member pair 140 horizontally on the upper portion 132 and the lower portion 138 of the vertical frame assembly 130 and coupling the upper portion 132 of the vertical frame assembly 130 to the lower portion 138 of the vertical frame assembly 130 by way of at least one removable bolt assembly 141.

FIGS. 15A and 15B illustrate that the method further includes step 202 of setting to horizontal or an obtuse angle, from a vertically folded state, a cantilevering coplanar arm assembly 150 with a proximal end 151, a distal end 159, and a middle portion 155, a right side portion 154 of the coplanar arm assembly 150 and a left side portion 156 of the coplanar arm assembly 150 coupled to a proximal rotatable pully assembly 161 and a distal rotatable pully assembly 169, the distal end of the coplanar arm assembly 150 rotatably coupled to the top end 131 of the vertical frame assembly 130, and at least partially rotating substantially vertically to the middle portion 155 of the coplanar arm assembly 150 a removably coupling support arm assembly 170 coupled to the upper portion 132 of the vertical support member at a proximal end 171 of the support arm assembly 170, then inserting a distal end of the support arm assembly 179 into a notch portion 153 of the cantilevering coplanar arm assembly 150 to create a substantially rigid triangular bracket structure 157.

The method further includes step 204 of attaching an object to a cable assembly 190 drawn from a winch assembly 180 mounted to the lower portion 138 of the vertical frame assembly 130, the cable assembly 190 while doing so pulled between the right side portion 154 and the left side portion 156 of the coplanar arm assembly 150 and over the distal pully assembly 169 and proximal pulley assembly 161 coupled to the coplanar arm assembly 150 to provide a lifting force to the object thereto attached to the cable assembly 190. The method further includes step 206 of rotating the winch assembly 180 to draw the object substantially at least one or more of toward the winch assembly 180 and upward.

FIGS. 15A and 15B illustrate that the method may further include step 210 of rotating the winch assembly 180 manually by way of a handle member. FIGS. 15A and 15B illustrate that the method may further include step 220 of rotating the winch assembly 180 by way of electric power.

FIGS. 15A and 15B illustrate that the method may further include step 230 of securing the load lifting and carrying apparatus 100 to a vehicle by inserting one or more corresponding bolt members 141 through one or more hole members 140 disposed through the base assembly 120 and a corresponding one or more hole members disposed through a vehicle hitch member. FIGS. 15A and 15B illustrate that the method may further include step 240 of lifting the object wherein the object is a deer or other animal carcass.

The following patents are incorporated by reference in their entireties: U.S. Pat. Nos. 6,109,855, 9,327,947, 20040256607A1, U.S. Pat. Nos. 6,189,866, 1,860,774, 6,152,675A, and 9,963,329.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A load lifting and carrying apparatus adapted for attachment to a vehicle comprising:
   a base assembly with a distal end and a proximal end, the distal end adapted to horizontally couple to a vehicle frame assembly;
   a vertical frame assembly with a top end and a bottom end, the bottom end of the vertical frame assembly coupled to the proximal end of the base assembly and supported by a proximal horizontal bracket support member, the vertical frame assembly horizontally divided to form an upper portion and a lower portion of the vertical frame assembly, the upper portion narrower than the lower portion and adapted to at least partially telescopically slide into the lower portion of the vertical frame assembly, at least one hole member pair aligned horizontally on the upper portion and the lower portion of the vertical frame assembly and coupled by at least one removable bolt assembly;
   a vertically foldable and cantilevering coplanar arm assembly with a proximal end, a distal end, and a middle portion, a right side portion of the coplanar arm assembly and a left side portion of the coplanar arm assembly coupled to a proximal rotatable pully assembly and a distal rotatable pully assembly, the distal end of the coplanar arm assembly rotatably coupled to the top end of the vertical frame assembly and adapted to at least partially rotate substantially vertically, the middle portion of the coplanar arm assembly removably coupled to a support arm assembly at a proximal end of the support arm assembly, a distal end of the support arm assembly pivotally coupled to the upper portion of the vertical support assembly and adapted, when coupled to the coplanar arm assembly, to create a substantially rigid triangular bracket structure, wherein a plurality of notch assemblies is disposed on a bottom portion of the vertically foldable and cantilevering coplanar arm assembly adapted to couple with and secure the distal end of the support arm assembly, the vertically foldable and cantilevering coplanar arm assembly adapted to be set at least one or more of a right angle and an obtuse angle relative to the vertical frame assembly; and
   a winch assembly mounted to the lower portion of the vertical frame assembly adapted to pull a cable assembly between the right and left side portions of the coplanar arm assembly and over the distal and proximal pully assemblies coupled to the coplanar arm assembly to provide a lifting force to an object attached to the cable assembly thereto.

2. The load lifting and carrying apparatus adapted for attachment to a vehicle of claim 1 wherein at least five hole member pairs are horizontally disposed on the upper portion of the vertical frame assembly and coupled by at least one removable bolt assembly to the lower portion of the vertical frame assembly adapted to set the vertical frame assembly at variable heights.

3. The load lifting and carrying apparatus adapted for attachment to a vehicle of claim 1 wherein the winch assembly is manually powered by way of a handle member.

4. The load lifting and carrying apparatus adapted for attachment to a vehicle of claim 1 wherein the winch assembly is electrically powered.

5. The load lifting and carrying apparatus adapted for attachment to a vehicle of claim 1 wherein one or more hole members are disposed through the base assembly adapted to be secured with one or more corresponding bolt members through corresponding hole members disposed through a vehicle hitch member.

6. The load lifting and carrying apparatus adapted for attachment to a vehicle of claim 1 wherein the vertical frame assembly can be set at a height substantially between 57 and 89 inches.

7. The load lifting and carrying apparatus adapted for attachment to a vehicle of claim 1 wherein the cantilevering coplanar arm assembly is substantially up to 26 inches long.

8. A method for loading a load lifting and carrying apparatus adapted for attachment to a vehicle, the method comprising the steps of:
   coupling to a vehicle frame assembly a base assembly with a distal end and a proximal end, the distal end adapted to horizontally couple to the vehicle frame assembly;
   setting the height of the vertical frame assembly wherein the vertical frame assembly has a top end and a bottom end, the bottom end of the vertical frame assembly coupled to the proximal end of the base assembly and supported by a proximal horizontal bracket support member, the vertical frame assembly horizontally divided to create an adjustable upper portion and a lower portion of the vertical frame assembly, the upper portion narrower than the lower portion and at least partially slid into the lower portion of the vertical frame assembly to set the height, the method further involving aligning at least one hole member pair horizontally on the upper portion and the lower portion of the vertical frame assembly and coupling the upper portion of the vertical frame assembly to the lower portion of the vertical frame assembly by way of at least one removable bolt assembly;

setting from a vertically folded state to a horizontal state or obtuse angled state, a cantilevering coplanar arm assembly with a proximal end, a distal end, and a middle portion, a right side portion of the coplanar arm assembly and a left side portion of the coplanar arm assembly coupled to a proximal rotatable pully assembly and a distal rotatable pully assembly, the distal end of the coplanar arm assembly rotatably coupled to the top end of the vertical frame assembly, and at least partially rotating substantially vertically to the middle portion of the coplanar arm assembly a removably coupling support arm assembly coupled to the upper portion of the vertical support member at a proximal end of the support arm assembly, then inserting a distal end of the support arm assembly into a notch portion of the cantilevering coplanar arm assembly to create a substantially rigid triangular bracket structure, wherein a plurality of notch assemblies includes the notch portion which is disposed on a bottom portion of the vertically foldable and cantilevering coplanar arm assembly adapted to couple with and secure the distal end of the support arm assembly, the vertically foldable and cantilevering coplanar arm assembly adapted to be set at least one or more of a right angle and an obtuse angle relative to the vertical frame assembly;

attaching an object to a cable assembly drawn from a winch assembly mounted to the lower portion of the vertical frame assembly, the cable assembly while doing so pulled between the right and left side portions of the coplanar arm assembly and over the distal and proximal pully assemblies coupled to the coplanar arm assembly to provide a lifting force to the object thereto attached to the cable assembly; and rotating the winch assembly to draw the object substantially at least one or more of toward the winch assembly and upward.

9. The method for loading a load lifting and carrying apparatus adapted for attachment to a vehicle of claim 8, the method further including rotating the winch assembly manually by way of a handle member.

10. The method for loading a load lifting and carrying apparatus adapted for attachment to a vehicle of claim 8, the method further including rotating the winch assembly by way of electric power.

11. The method for loading a load lifting and carrying apparatus adapted for attachment to a vehicle of claim 8, the method further including securing the load lifting and carrying apparatus to a vehicle by inserting one or more corresponding bolt members through one or more hole members disposed through the base assembly and a corresponding one or more hole members disposed through a vehicle hitch member.

12. The method for loading a load lifting and carrying apparatus adapted for attachment to a vehicle of claim 8, the method further including lifting the object wherein the object is an animal carcass.

13. A load lifting and carrying apparatus adapted for attachment to a vehicle comprising:
a base assembly with a distal end and a proximal end, the distal end adapted to horizontally couple to a vehicle frame assembly;
a vertical frame assembly with a top end and a bottom end, the bottom end of the vertical frame assembly coupled to the proximal end of the base assembly and supported by a proximal horizontal bracket support member, the vertical frame assembly horizontally divided to create an upper portion and a lower portion of the vertical frame assembly, the upper portion narrower than the lower portion and adapted to at least partially slide into the lower portion of the vertical frame assembly, five hole member pairs disposed through the upper portion of the vertical frame assembly adapted to be aligned horizontally with two hole member pairs disposed through the lower portion of the vertical frame assembly and coupled by two removable bolt members, one in each of the aligned hole member pairs;
a vertically foldable and cantilevering coplanar arm assembly with a proximal end, a distal end, and a middle portion, a bottom portion of the cantilevering coplanar arm assembly having three notch portions disposed thereon, a right side portion of the coplanar arm assembly and a left side portion of the coplanar arm assembly coupled to a proximal rotatable pully assembly and a distal rotatable pully assembly, the distal end of the coplanar arm assembly rotatably coupled to the top end of the vertical frame assembly and adapted to at least partially rotate substantially vertically, the middle portion of the coplanar arm assembly removably coupled to a support arm assembly at a proximal end of the support arm assembly, a distal end of the support arm assembly pivotally coupled to the upper portion of the vertical support assembly and adapted, when coupled to the coplanar arm assembly, to create a substantially rigid triangular bracket structure;
a right side portion and a left side portion of the rotatable pully assembly having four each horizontally corresponding hole members adapted to align with a hole member horizontally disposed through an upper portion of the upper vertical frame assembly, a bolt member adapted to be disposed through corresponding hole members of the vertical frame assembly and the right side portion and the left side portion of the rotatable pully assembly, the bolt member adapted to secure the foldable and cantilevering coplanar arm assembly at a selected angle; and
a manual winch and handle assembly mounted to the lower portion of the vertical frame assembly adapted to pull a cable assembly between the right and left side portions of the coplanar arm assembly and over the distal and proximal pully assemblies coupled to the coplanar arm assembly to provide a lifting force to an object attached to the cable assembly thereto.

14. The load lifting and carrying apparatus adapted for attachment to a vehicle of claim 13 wherein the vertical frame assembly can be set substantially at various heights in a range of 58 through 88 inches.

15. The load lifting and carrying apparatus adapted for attachment to a vehicle of claim 13 wherein a hole member horizontally is disposed through the support arm assembly and is adapted to align with a hole member horizontally disposed through the upper portion of the upper vertical frame assembly when the cantilevering arm assembly is in a folded state.

16. The load lifting and carrying apparatus adapted for attachment to a vehicle of claim 13 wherein the vertical frame assembly includes a light assembly for illumination.

17. The load lifting and carrying apparatus adapted for attachment to a vehicle of claim 13 wherein the winch assembly further includes an electrical motor to power the winch assembly.

18. The load lifting and carrying apparatus adapted for attachment to a vehicle of claim 16 wherein the light assembly includes a solar cell and a battery for providing portable energy.

19. The load lifting and carrying apparatus adapted for attachment to a vehicle of claim 13 wherein the cantilevering coplanar arm assembly can be set substantially at any one of 0 degrees, 90 degrees, 110 degrees, and 130 degrees.

* * * * *